US012784556B2

(12) United States Patent
Kato

(10) Patent No.: US 12,784,556 B2
(45) Date of Patent: Nov. 3, 2026

(54) AUDITORY TACTILE SENSE PRESENTATION DEVICE AND AUDITORY TACTILE SENSE PRESENTATION METHOD

(71) Applicant: TDK CORPORATION, Tokyo (JP)

(72) Inventor: Takashi Kato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 68 days.

(21) Appl. No.: 18/673,655

(22) Filed: May 24, 2024

(65) Prior Publication Data

US 2025/0022354 A1 Jan. 16, 2025

(30) Foreign Application Priority Data

Jul. 13, 2023 (JP) ................................ 2023-115143

(51) Int. Cl.
*G08B 7/06* (2006.01)

(52) U.S. Cl.
CPC ..................................... *G08B 7/06* (2013.01)

(58) Field of Classification Search
CPC ................................... G08B 7/06; G08B 6/00
USPC ...................................................... 340/384.3
See application file for complete search history.

(56) References Cited

U.S. PATENT DOCUMENTS

2012/0206247 A1* 8/2012 Bhatia .................... G09G 5/006 340/407.1
2014/0300454 A1* 10/2014 Lacroix .................... G08B 6/00 340/407.2
2016/0004311 A1* 1/2016 Yliaho .................... G06F 3/165 381/99
2025/0021162 A1* 1/2025 Jeong .................. B67D 1/0878

FOREIGN PATENT DOCUMENTS

JP 2005-339298 A 12/2005
JP 2013-161473 A 8/2013
WO 02/21881 A1 3/2002

OTHER PUBLICATIONS

Translation of Sep. 29, 2026 Office Action issued in Japanese Application No. 2023-115143.

* cited by examiner

*Primary Examiner* — Brian Wilson
(74) *Attorney, Agent, or Firm* — Oliff PLC

(57) ABSTRACT

An auditory tactile sense presentation device includes: a reception unit configured to receive an input of a drive signal; and an output unit configured to perform an output based on the drive signal, in which the output unit is configured by a vibrator including a piezoelectric element, and the vibrator outputs, in the drive signal, a signal component having a frequency higher than a predetermined frequency as audio and outputs a signal component having a frequency equal to or lower than the predetermined frequency as vibration.

10 Claims, 6 Drawing Sheets

AUDITORY TACTILE SENSE PRESENTATION DEVICE AND AUDITORY TACTILE SENSE PRESENTATION METHOD

CROSS-REFERENCE TO RELATED APPLICATIONS

This application is based upon and claims the benefit of priority from Japanese Patent Application No. 2023-115143, filed on Jul. 13, 2023, the entire contents of which are incorporated herein by reference.

TECHNICAL FIELD

The present disclosure relates to an auditory tactile sense presentation device and an auditory tactile sense presentation method.

BACKGROUND

As a technology for presenting a tactile sense by vibration, for example, there is an input device described in Japanese Unexamined Patent Publication No. 2005-339298. In this conventional input device, contact by a user's finger or the like is detected by a capacitive sensor, and a drive signal is supplied to a piezoelectric actuator based on a detection result. By vibrating a contact portion of the finger by the piezoelectric actuator, a tactile sense indicating that the input has been received is presented to the user.

SUMMARY

In the conventional device as described above, the tactile sense by vibration is presented to a portion actually touched by the finger or the like. However, senses for various actual events include not only a tactile sense but also an auditory sense, and there is a need for a technology capable of presenting a realistic auditory tactile sense.

The present disclosure has been made to solve the above problem, and an object thereof is to provide an auditory tactile sense presentation device and an auditory tactile sense presentation method capable of presenting a realistic auditory tactile sense.

Solution to Problem

An auditory tactile sense presentation device according to one aspect of the present disclosure includes: a reception unit configured to receive an input of a drive signal; and an output unit configured to perform an output based on the drive signal, in which the output unit is configured by a vibrator including a piezoelectric element, and the vibrator outputs, in the drive signal, a signal component having a frequency higher than a predetermined frequency as audio and outputs a signal component having a frequency equal to or lower than the predetermined frequency as vibration.

In this auditory tactile sense presentation device, the output unit is configured by the vibrator including the piezoelectric element. Due to the characteristics of the piezoelectric element, the signal component having the frequency higher than the predetermined frequency can be output as sound and vibration, and the signal component having the frequency equal to or lower than the predetermined frequency can be output as vibration, but it is difficult to output the signal component as sound. The auditory tactile sense presentation device uses the characteristics of the piezoelectric element to output, in the drive signal, the signal component having the frequency higher than the predetermined frequency as audio and output the signal component having the frequency equal to or lower than the predetermined frequency as vibration. As a result, it is possible to present a realistic auditory tactile sense combining an auditory sense by sound and a tactile sense by vibration.

The predetermined frequency may be 200 Hz. In the piezoelectric element, a frequency region in which output as sound is possible is typically a region larger than 200 Hz. Therefore, by setting the predetermined frequency of a boundary between the output as audio and the output as vibration to 200 Hz, it is possible to more appropriately combine the auditory sense by sound and the tactile sense by vibration.

The drive signal may be a digital signal. As a result, it is possible to improve convenience of storage of the drive signal and input to a reception unit.

The drive signal may be a signal obtained by superimposing an audio signal and a vibration signal set for a period during which an amplitude of the audio signal exceeds a predetermined threshold. By using such a superimposed signal as the drive signal, it is possible to present a more realistic auditory tactile sense in the output unit.

The vibration signal may be a sine wave. Since the vibration signal is a sine wave, it is possible to suppress the output as audio from being mixed with the output as vibration in the region of the predetermined frequency or less.

The vibration signal may have a plurality of frequency components. In this case, it is possible to present a more realistic auditory tactile sense by vibration with added intensity.

The auditory tactile sense presentation device may include an amplification unit configured to amplify the drive signal and output the amplified drive signal to the output unit. As a result, a clearer auditory tactile sense can be presented in the output unit.

The auditory tactile sense presentation device may include a signal generation unit configured by a vibrator including a piezoelectric element and configured to generate, as the drive signal, a signal based on a voltage generated according to a pressing force applied to the piezoelectric element. In this case, an auditory tactile sense generated by the signal generation unit can be transmitted to a remote position.

The auditory tactile sense presentation device may include a conversion unit configured to convert the signal from the signal generation unit into a digital signal and transmit the digital signal to the reception unit via a network, and a restoration unit configured to restore the digital signal received by the reception unit via the network to a signal before conversion. In this case, the auditory tactile sense generated by the signal generation unit can be transmitted to a further remote position via the network.

An auditory tactile sense presentation method according to one aspect of the present disclosure includes: a reception step of receiving an input of a drive signal in a reception unit; and an output step of performing an output based on the drive signal in an output unit configured by a vibrator including a piezoelectric element, in which in the output step, in the drive signal, a signal component having a frequency higher than a predetermined frequency is output as audio, and a signal component having a frequency equal to or lower than the predetermined frequency is output as vibration.

In this auditory tactile sense presentation method, the output unit is configured by the vibrator including the piezoelectric element. Due to the characteristics of the piezoelectric element, the signal component having the frequency higher than the predetermined frequency can be output as sound and vibration, and the signal component having the frequency equal to or lower than the predetermined frequency can be output as vibration, but it is difficult to output the signal component as sound. In this auditory tactile sense presentation method, in the drive signal, the signal component having the frequency higher than the predetermined frequency is output as audio, and the signal component having the frequency equal to or lower than the predetermined frequency is output as vibration using the characteristics of the piezoelectric element. As a result, it is possible to present a realistic auditory tactile sense combining an auditory sense by sound and a tactile sense by vibration.

DETAILED DESCRIPTION

Hereinafter, preferred embodiments of an auditory tactile sense presentation device and an auditory tactile sense presentation method according to one aspect of the present disclosure will be described in detail with reference to the drawings.

First Embodiment

Figure 1:
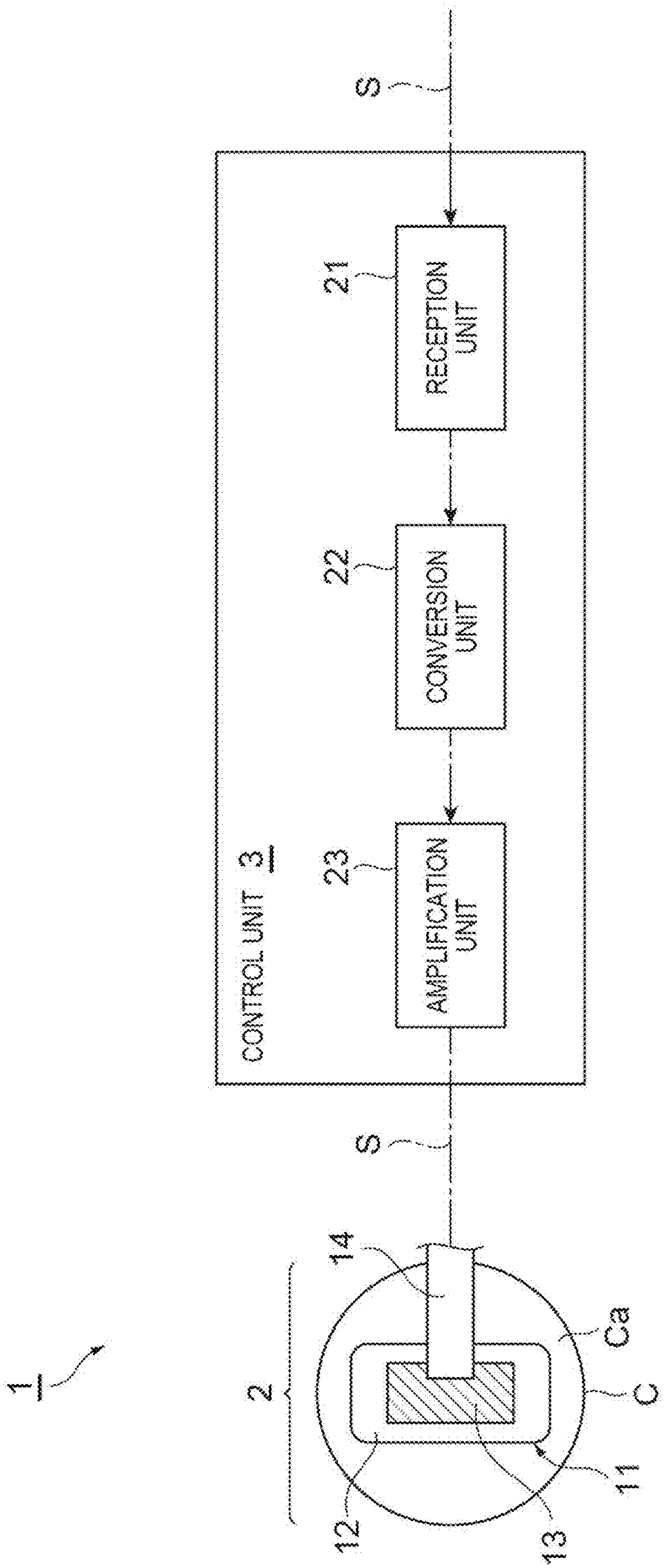
FIG. 1 is a schematic diagram illustrating a configuration of an auditory tactile sense presentation device according to a first embodiment of the present disclosure.

FIG. 1 is a schematic diagram illustrating a configuration of an auditory tactile sense presentation device according to a first embodiment of the present disclosure. As illustrated in FIG. 1, an auditory tactile sense presentation device 1 according to the present embodiment includes an output unit 2 and a control unit 3. The auditory tactile sense presentation device 1 is a device that presents an auditory tactile sense in the output unit 2 based on a drive signal S input to the control unit 3.

Figure 2:
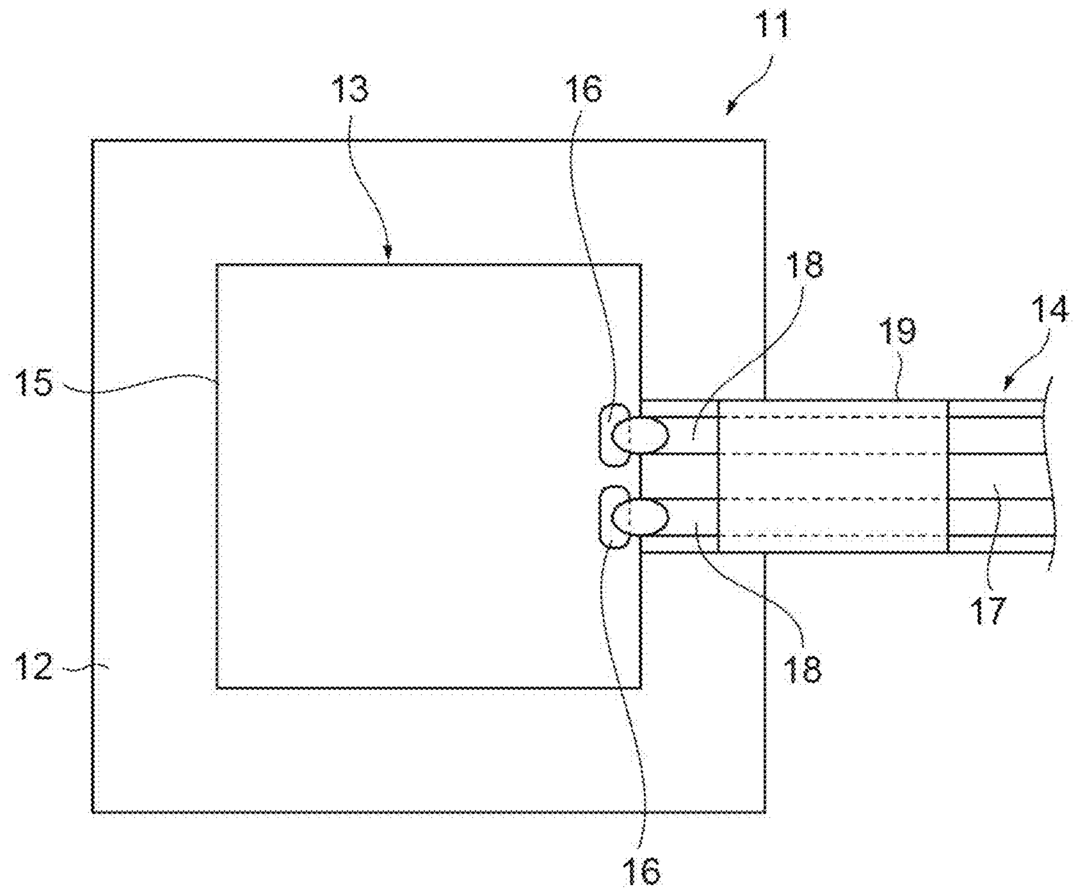
FIG. 2 is a schematic plan diagram illustrating a configuration of a vibrator.

The output unit 2 is a unit that performs an output based on the drive signal S. The output unit 2 is configured by a vibrator 11 including a piezoelectric element 13. FIG. 2 is a schematic plan diagram illustrating a configuration of the vibrator. As illustrated in FIG. 2, the vibrator 11 includes a diaphragm 12, a piezoelectric element 13 disposed on one surface side of the diaphragm 12, and a wiring member 14 electrically coupled to the piezoelectric element 13. The diaphragm 12 has, for example, a rectangular shape in plan view. Examples of a constituent material of the diaphragm 12 include Ni—Fe alloy, Ni, brass, stainless steel, and the like.

The piezoelectric element 13 includes, for example, a piezoelectric element body 15, an internal electrode (not illustrated), and a pair of external electrodes 16 and 16. The piezoelectric element body 15 has, for example, a flat rectangular parallelepiped shape. The rectangular parallelepiped shape includes a shape in which corner portions and ridge portions are chamfered and a shape in which corner portions and ridge portions are rounded. In the vibrator 11, the diaphragm 12 may be omitted, and only the piezoelectric element 13 may configure the vibrator 11.

The piezoelectric element body 15 is formed by laminating a plurality of piezoelectric layers, for example. The piezoelectric layer is made of a piezoelectric material. In the present embodiment, the piezoelectric layer is made of a piezoelectric ceramic material. Examples of the piezoelectric ceramic material include PZT[Pb(Zr, Ti)$O_3$], PT(Pb-Ti$O_3$), PLZT[(Pb, La)(Zr, Ti)$O_3$], barium titanate, and the like. The piezoelectric layer is configured by, for example, a sintered body of a ceramic green sheet including the above-described piezoelectric ceramic material. In the actual piezoelectric element body 15, the piezoelectric layers are integrated to such an extent that boundaries between the piezoelectric layers cannot be recognized.

The internal electrode and the external electrodes 16 and 16 are made of a conductive material. Examples of the conductive material include Ag, Pd, an Ag—Pd alloy, and the like. The internal electrode and the external electrode are configured by, for example, a sintered body of a conductive paste including the above-described conductive material.

The wiring member 14 is configured by, for example, a flexible printed circuit board (FPC). The wiring member 14 has a base member 17, a pair of conductors 18 and 18, and a cover 19. The base member 17 is made of an electrically insulating material such as a polyimide resin. The conductors 18 and 18 are made of a conductive material such as copper. The conductors 18 and 18 are joined to the base member 17 in a state of being separated from each other by adhesion or the like.

Similarly to the base member 17, the cover 19 is made of an electrically insulating material such as a polyimide resin. The cover 19 is disposed so as to cover parts of the conductors 18 and 18, and is joined to the base member 17 by adhesion or the like. End portions of the conductors 18 and 18 are exposed from the cover 19. The exposed portions of the conductors 18 and 18 from the cover 19 may be plated with nickel or gold. Distal end portions of the wiring member 14 (conductors 18 and 18 at end portions on the piezoelectric element 13 side) are electrically coupled to the external electrodes 16 and 16, respectively. A base end portion (end portion on the control unit 3 side) of the wiring member 14 is electrically coupled to the control unit 3.

The control unit 3 is a unit that controls the operation of the vibrator 11 configuring the output unit 2. The control unit 3 physically includes a computer system including a memory such as a RAM and a ROM, a processor such as a CPU, a communication interface, a storage unit such as a hard disk, a display, and the like. Examples of the configuration of the control unit 3 include a personal computer, a cloud server, a smart device (smartphone and tablet terminal), and the like.

As illustrated in FIG. 1, the control unit 3 includes a reception unit 21, a conversion unit 22, and an amplification unit 23 as functional components. The reception unit 21 is a unit that receives an input of the drive signal S. The drive signal S is, for example, a digital signal. Example of the digital signal includes a digital audio signal compressed using an audio file format such as MP3. The input form of the drive signal S to the reception unit 21 is not particularly limited, and any form such as reception from another personal computer, reading from a storage medium, reception via the Internet, and the like can be adopted. The reception unit 21 outputs the input drive signal S to the conversion unit 22.

Figure 3:
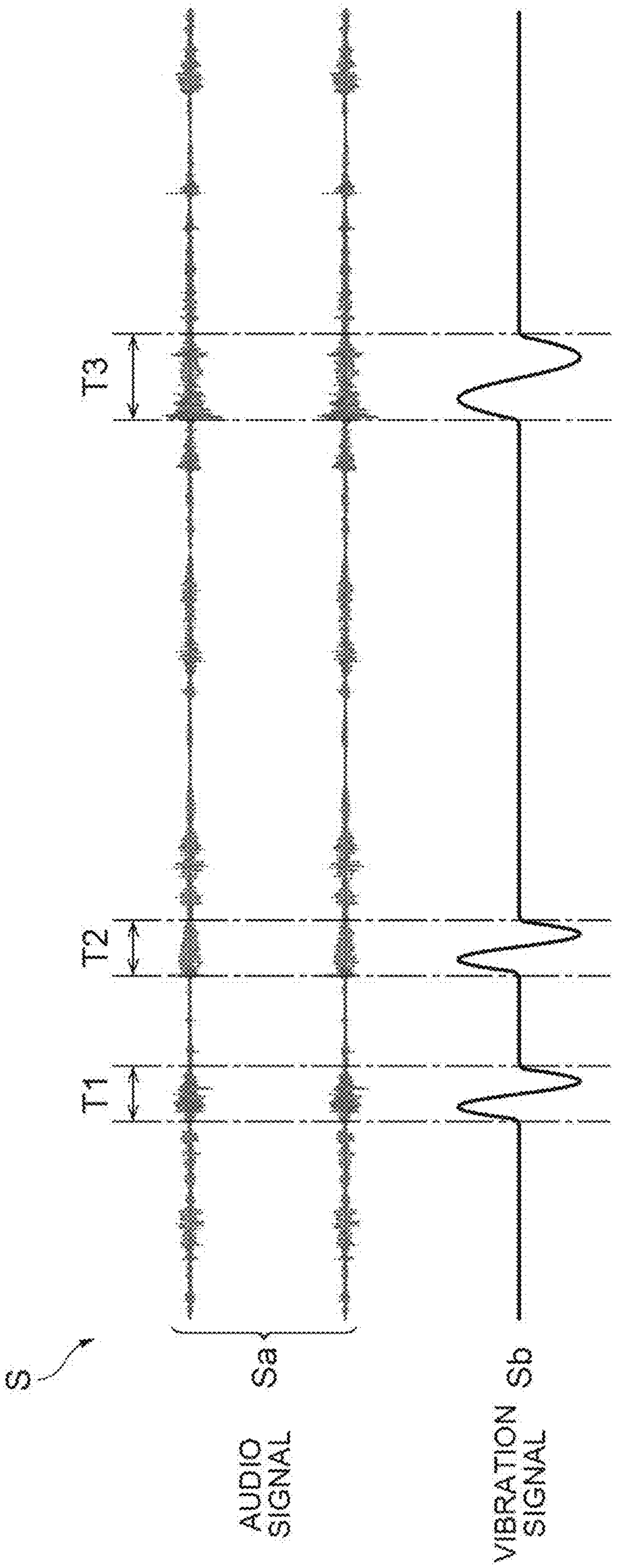
FIG. 3 is a diagram illustrating an example of a drive signal.

In the present embodiment, as illustrated in FIG. 3, the drive signal S is a signal obtained by superimposing an audio signal Sa and a vibration signal Sb. The audio signal Sa is, for example, a signal including a frequency component of about 20 Hz to 20,000 Hz which is a human audible range. The audio signal Sa may be generated by collecting sound generated from various events, for example, or may be generated by artificially editing using a personal computer or the like. In the example of FIG. 3, the audio signal Sa is generated by collecting sound when an ice piece is rotated in a paper cup with a microphone or the like.

The vibration signal Sb is generated based on, for example, the audio signal Sa. The vibration signal Sb is set for a period during which an amplitude of the audio signal Sa exceeds a predetermined threshold. In the example of FIG. 3, the amplitude of the audio signal Sa exceeds a predetermined threshold in periods T1, T2, and T3 separated from each other, and the vibration signal Sb is allocated to each of the periods T1, T2, and T3.

The vibration signal Sb is configured by a frequency component having a frequency equal to or lower than a predetermined frequency in the above-described audible range. The predetermined frequency is set based on a lower limit of a frequency at which the piezoelectric element 13 can output sound in consideration of the output characteristics of the piezoelectric element 13 configuring the vibrator 11. The predetermined frequency is, for example, 200 Hz. The vibration signal Sb is a sine wave and configured by a frequency component having a frequency equal to or lower than 200 Hz which is the predetermined frequency. The vibration signal Sb may have a plurality of frequency components in a range of the predetermined frequency or less. The frequency of the vibration signal Sb in each period may increase in proportion to a maximum value of the amplitude in the period during which the amplitude of the audio signal Sa exceeds the predetermined threshold. In the example of FIG. 3, the vibration signal Sb having a frequency component of 200 Hz is allocated to the periods T1 and T2, and the vibration signal Sb having a frequency component of 100 Hz is allocated to the period T3.

The conversion unit 22 is a unit that converts the drive signal S, which is a digital signal, into an analog signal. Upon receiving the drive signal S, which is a digital signal, from the reception unit 21, the conversion unit 22 converts the drive signal S into an analog signal representing the amplitude and the frequency of the voltage generated in the piezoelectric element 13. The conversion unit 22 outputs the drive signal S converted into the analog signal to the amplification unit 23.

The amplification unit 23 is a unit that amplifies the value of the drive signal S. The amplification unit 23 is configured by a signal amplifier, amplifies the drive signal S received from the conversion unit 22 at a predetermined magnification, and outputs the drive signal S to the output unit 2.

The vibrator 11 operates based on the drive signal S received from the amplification unit 23. More specifically, the vibrator 11 outputs, in the drive signal S, a signal component having a frequency higher than a predetermined frequency as audio, and outputs a signal component having a frequency equal to or lower than the predetermined frequency as vibration. In the present embodiment, the vibrator 11 outputs, in the audio signal Sa illustrated in FIG. 3, a signal component higher than 200 Hz as audio, and outputs the vibration signal Sb including a frequency component of 200 Hz or less as vibration.

As described above, the drive signal S of the present embodiment is, for example, a signal for sound and vibration when an ice piece is rotated in a paper cup. In the example of FIG. 1, the vibrator 11 is fixed to a bottom surface Ca of a paper cup C. By outputting audio and vibration from the vibrator 11 based on the drive signal S, sound and vibration when the ice piece is rotated in the paper cup are reproduced as if the sound and vibration were generated in the paper cup C.

Figure 4:
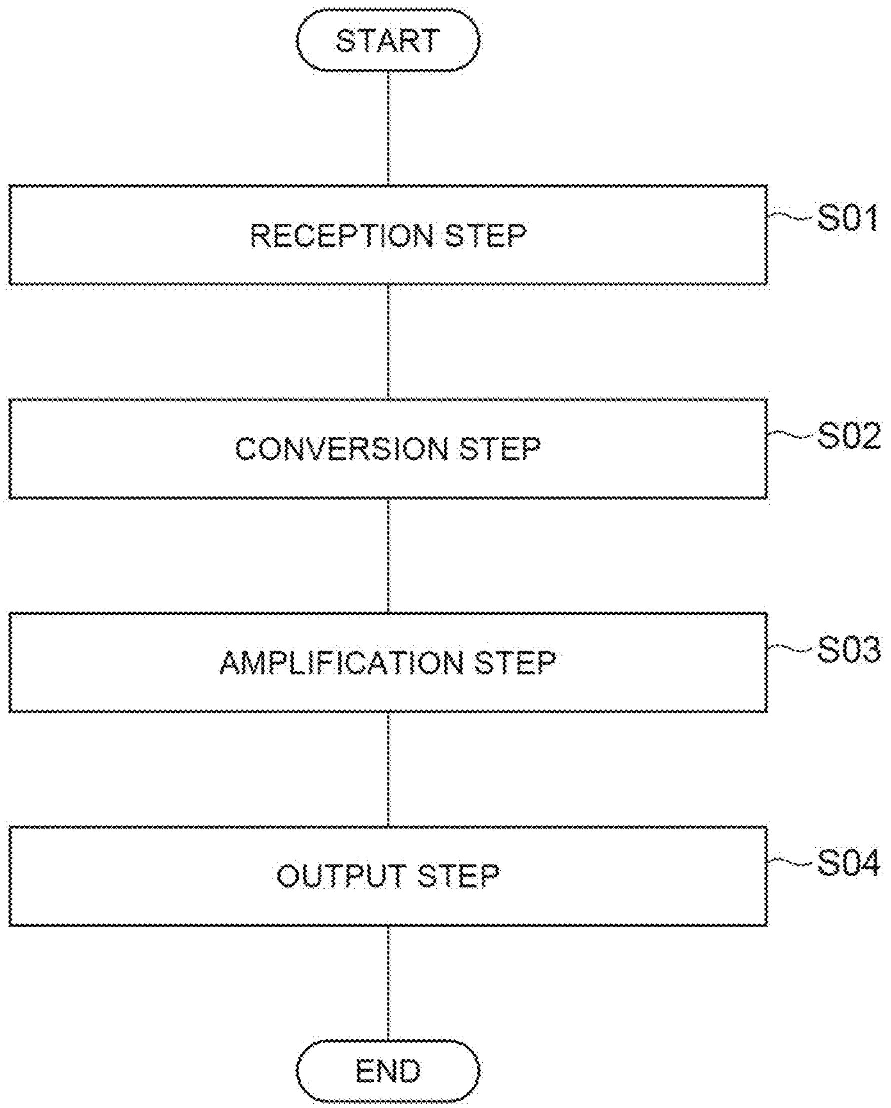
FIG. 4 is a flowchart illustrating an auditory tactile sense presentation method by the device in FIG. 1.

FIG. 4 is a flowchart illustrating an auditory tactile sense presentation method by the device of FIG. 1. As illustrated in FIG. 4, the auditory tactile sense presentation method includes a reception step S01, a conversion step S02, an amplification step S03, and an output step S04.

The reception step S01 is a step of receiving an input of the drive signal S in the reception unit 21. In the reception step S01, a digital signal obtained by superimposing the audio signal Sa and the vibration signal Sb is input to the reception unit 21 as the drive signal S. The conversion step S02 is a step of converting a signal format of the drive signal S. In the conversion step S02, the drive signal S, which is a digital signal, is converted into an analog signal in the conversion unit 22, and is output to the amplification unit 23.

The amplification step S03 is a step of amplifying the drive signal S. In the amplification step S03, the drive signal S received from the conversion unit 22 is amplified by the signal amplifier at a predetermined magnification and output to the output unit 2. The output step S04 is a step of performing an output based on the drive signal S in the output unit 2 configured by the vibrator 11 including the piezoelectric element 13. In the output step S04, in the drive signal S, a signal component having a frequency higher than a predetermined frequency is output as audio, and a signal component having a frequency equal to or lower than the predetermined frequency is output as vibration. As a result, the output unit 2 presents an auditory tactile sense combining an auditory sense by sound and a tactile sense by vibration.

As described above, in the auditory tactile sense presentation device 1 and the auditory tactile sense presentation method, the output unit 2 is configured by the vibrator 11 including the piezoelectric element 13. Due to the characteristics of the piezoelectric element 13, a signal component having a frequency higher than a predetermined frequency can be output as sound and vibration, and a signal component having a frequency equal to or lower than the predetermined frequency can be output as vibration, but it is difficult to output the signal component as sound. In the auditory tactile sense presentation device 1 and the auditory tactile sense presentation method, in the drive signal S, a signal component having a frequency higher than a predetermined frequency is output as audio, and a signal component having a frequency equal to or lower than the predetermined frequency is output as vibration using the characteristics of the piezoelectric element 13. As a result, it is possible to present a realistic auditory tactile sense combining an auditory sense by sound and a tactile sense by vibration.

In the present embodiment, the above predetermined frequency is 200 Hz. In the piezoelectric element 13, a frequency region in which output as sound is possible is typically a region larger than 200 Hz. Therefore, by setting the predetermined frequency of a boundary between the output as audio and the output as vibration to 200 Hz, it is possible to more appropriately combine the auditory sense by sound and the tactile sense by vibration.

In the present embodiment, the drive signal S is a digital signal. As a result, it is possible to improve convenience of storage of the drive signal S and input to the reception unit 21. Further, in the present embodiment, the drive signal S is a signal obtained by superimposing the audio signal Sa and the vibration signal Sb set for the period during which the amplitude of the audio signal Sa exceeds the predetermined threshold. By using such a superimposed signal as the drive signal S, it is possible to present a more realistic auditory tactile sense in the output unit 2.

In the present embodiment, the vibration signal Sb is a sine wave. Since the vibration signal Sb is a sine wave, it is possible to suppress the output as audio from being mixed with the output as vibration in a region of a predetermined frequency or less as compared with a case where the vibration signal Sb is a rectangular wave or a sawtooth wave. In the present embodiment, the vibration signal Sb has a plurality of frequency components. According to such a configuration, it is possible to present a more realistic auditory tactile sense by vibration with added intensity.

In the present embodiment, the auditory tactile sense presentation device 1 includes the amplification unit 23 that amplifies the drive signal S and outputs the amplified drive signal S to the output unit 2. As a result, a clearer auditory tactile sense can be presented in the output unit 2.

Second Embodiment

Figure 5:
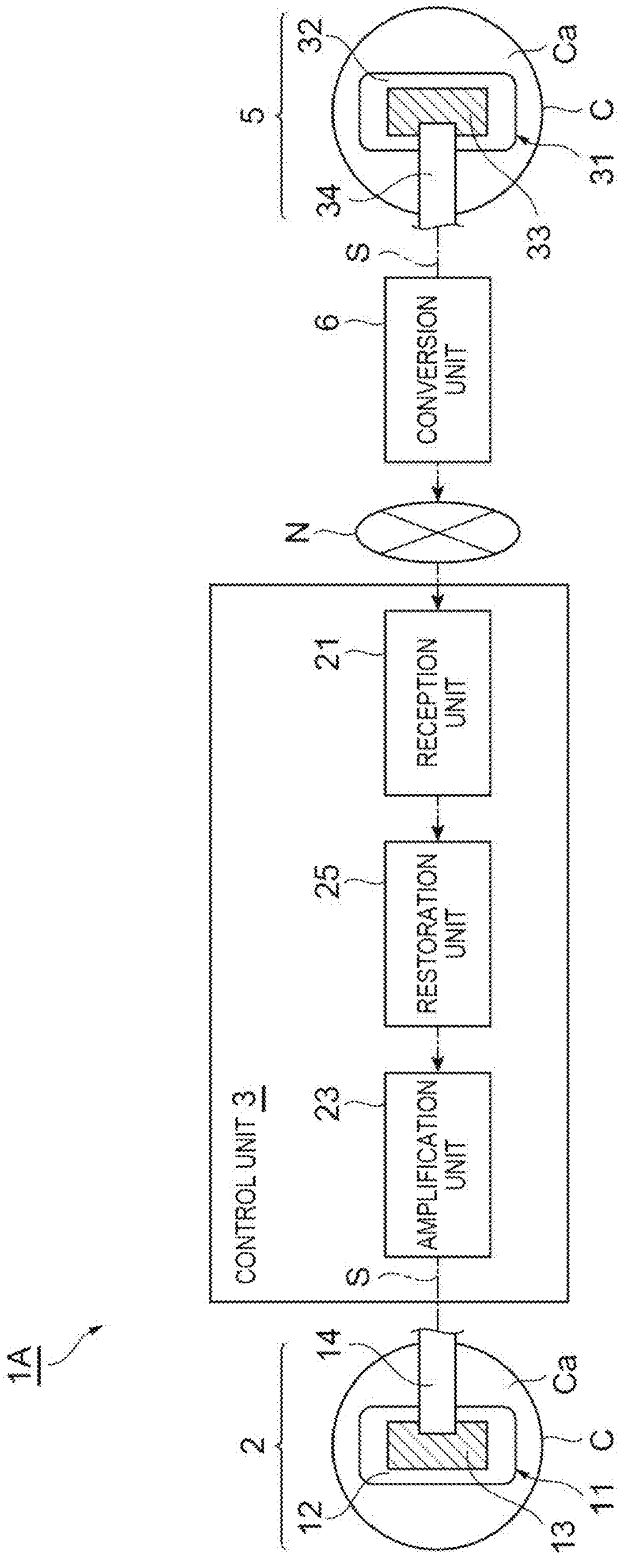
FIG. 5 is a schematic diagram illustrating a configuration of an auditory tactile sense presentation device according to a second embodiment of the present disclosure.

FIG. 5 is a schematic diagram illustrating a configuration of an auditory tactile sense presentation device according to a second embodiment of the present disclosure. As illustrated in FIG. 5, an auditory tactile sense presentation device 1A according to the second embodiment is different from the auditory tactile sense presentation device 1 according to the first embodiment in that the auditory tactile sense presentation device 1A is configured to be capable of generating a drive signal S and transmitting the generated drive signal S to the output unit 2 located at a remote position.

Specifically, the auditory tactile sense presentation device 1A includes a signal generation unit 5 and a conversion unit 6 in addition to the output unit 2 and the control unit 3. In addition, the control unit 3 has a restoration unit 25 instead of the conversion unit 22 of the first embodiment.

The signal generation unit 5 is configured by a vibrator 31 including a piezoelectric element 33. In the present embodiment, the vibrator 31 has the same configuration as the vibrator 11 configuring the output unit 2. That is, the vibrator 31 includes a diaphragm 32, a piezoelectric element 33 disposed on one surface side of the diaphragm 32, and a wiring member 34 electrically coupled to the piezoelectric element 33. The configurations of the diaphragm 32, the piezoelectric element 33, and the wiring member 34 are the same as those of the diaphragm 12, the piezoelectric element 13, and the wiring member 14, and thus descriptions thereof are omitted.

The vibrator 31 generates a signal based on a voltage generated according to a pressing force applied to the piezoelectric element 33 as a drive signal S. The drive signal S here is an analog signal representing an amplitude and a frequency of the voltage generated in the piezoelectric element 13. In the example of FIG. 5, the vibrator 31 is fixed to a bottom surface Ca of a paper cup C. When the ice piece is rotated in the paper cup C, the signal generation unit 5 generates the drive signal S based on the voltage generated according to the pressing force applied to the piezoelectric element 33 at that time. The signal generation unit 5 outputs the generated drive signal S to the conversion unit 6.

The conversion unit 6 is a unit that converts the signal from the signal generation unit 5 into a digital signal. The conversion unit 6 is physically a computer system including a memory such as a RAM and a ROM, a processor such as a CPU, a communication interface, a storage unit such as a hard disk, a display, and the like, similarly to the control unit 3. The conversion unit 6 converts the analog signal received from the signal generation unit 5 into a digital audio signal compressed using an audio file format such as MP3. The conversion unit 6 transmits the converted digital signal to the control unit 3 via the network N.

The reception unit 21 receives the digital signal from the conversion unit 6 via the network N, and outputs the digital signal to the restoration unit 25. The restoration unit 25 restores the digital signal received by the reception unit 21 via the network N to an analog signal before conversion and outputs the analog signal to the amplification unit 23. The amplification unit 23 amplifies the received analog signal at a predetermined magnification and outputs the amplified analog signal to the output unit 2. In the output unit 2, audio and vibration are output from the vibrator 11 based on the drive signal S, and similarly to the first embodiment, sound and vibration in a case where the ice piece is rotated in the paper cup are reproduced as if the sound and the vibration were generated in the paper cup C to which the vibrator 11 is fixed.

Figure 6:
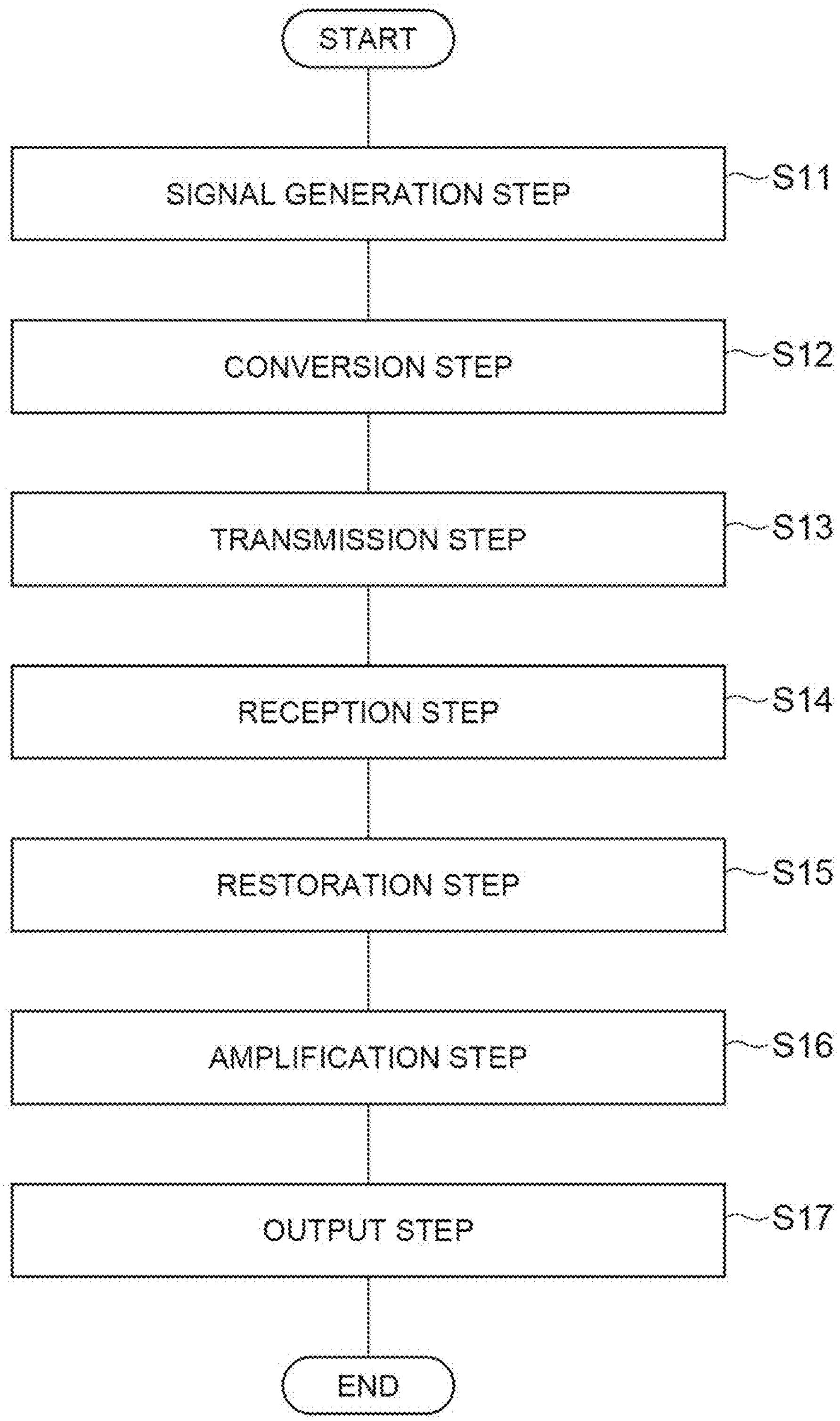
FIG. 6 is a flowchart illustrating an auditory tactile sense presentation method by the device in FIG. 5.

FIG. 6 is a flowchart illustrating an auditory tactile sense presentation method by the device of FIG. 5. As illustrated in FIG. 6, the tactile sense presentation method includes a signal generation step S11, a conversion step S12, a transmission step S13, a reception step S14, a restoration step S15, an amplification step S16, and an output step S17.

The signal generation step S11 is a step of generating a signal based on the generated voltage as the drive signal S in the signal generation unit 5 configured by the vibrator 31 including the piezoelectric element 33. In the signal generation step S11, the piezoelectric element 33 configuring the vibrator 31 generates a voltage according to the applied pressing force, and generates an analog signal based on the generated voltage as the drive signal S.

In the conversion step S12, the conversion unit 6 converts the signal from the signal generation unit 5 into a digital signal. In the transmission step S13, the converted digital signal is transmitted to the reception unit 21 via the network N. In the reception step S14, the reception unit 21 receives the input of the drive signal S, and outputs the input drive signal S to the restoration unit 25.

The restoration step S15 is a step of restoring the digital signal to a signal before conversion. In the restoration step S15, the restoration unit 25 restores the digital signal received by the reception unit 21 via the network N to an analog signal and outputs the analog signal to the amplification unit 23. In the amplification step S16, the drive signal S received from the restoration unit 25 is amplified by the signal amplifier in the amplification unit 23 at a predetermined magnification and output to the output unit 2. In the output step S17, in the output unit 2 configured by the vibrator 11 including the piezoelectric element 13, in the drive signal S, a signal component having a frequency higher than a predetermined frequency is output as audio, and a signal component having a frequency equal to or lower than the predetermined frequency is output as vibration. As a result, the output unit 2 presents an auditory tactile sense combining an auditory sense by sound and a tactile sense by vibration.

Even in such an auditory tactile sense presentation device 1A and an auditory tactile sense presentation method, the same effects as those of the first embodiment are obtained, and it is possible to present a realistic auditory tactile sense combining an auditory sense by sound and a tactile sense by vibration. In the present embodiment, the signal generation unit 5 configured by the vibrator 31 including the piezoelectric element 33 is provided, and a signal based on a voltage generated according to a pressing force applied to the piezoelectric element 33 is generated as the drive signal S. As a result, it is possible to transmit the auditory tactile sense generated by the signal generation unit 5 to the remote position.

Furthermore, in the present embodiment, there are provided the conversion unit 6 that converts the signal from the signal generation unit 5 into a digital signal and transmits the digital signal to the reception unit via the network N, and the restoration unit 25 that restores the digital signal received by the reception unit 21 via the network N to a signal before conversion and outputs the signal to the output unit 2. With such a configuration, the auditory tactile sense generated by the signal generation unit 5 can be transmitted to a further remote position via the network N.

What is claimed is:

1. An auditory tactile sense presentation device comprising:

a receptor configured to receive an input of a drive signal; and an output unit configured to perform an output based on the drive signal, wherein the output unit is configured by a vibrator including a diaphragm and a piezoelectric element disposed on one surface of the diaphragm, the vibrator outputs, in the drive signal, a signal component having a frequency higher than a predetermined frequency as audio and outputs a signal component having a frequency equal to or lower than the predetermined frequency as vibration, and the drive signal is a signal obtained by superimposing an audio signal and a vibration signal set for a period during which an amplitude of the audio signal exceeds a predetermined threshold, and the vibration signal is generated based on the threshold of the amplitude of the audio signal that has been input.

2. The auditory tactile sense presentation device according to claim 1, wherein the predetermined frequency is 200 Hz.

3. The auditory tactile sense presentation device according to claim 1, wherein the drive signal is a digital signal.

4. The auditory tactile sense presentation device according to claim 1, wherein the vibration signal is a sine wave.

5. The auditory tactile sense presentation device according to claim 1, wherein the vibration signal has a plurality of frequency components.

6. The auditory tactile sense presentation device according to claim 1, comprising an amplifier configured to amplify the drive signal and output the amplified drive signal to the output unit.

7. The auditory tactile sense presentation device according to claim 1, comprising a signal generator configured by a vibrator including a piezoelectric element and configured to generate, as the drive signal, a signal based on a voltage generated according to a pressing force applied to the piezoelectric element.

8. The auditory tactile sense presentation device according to claim 7, comprising:

a converter configured to convert the signal from the signal generator into a digital signal and transmit the digital signal to the receptor via a network; and a restorer configured to restore the digital signal received by the receptor via the network to a signal before conversion.

9. An auditory tactile sense presentation method comprising:

receiving an input of a drive signal in a receptor; and outputting based on the drive signal in an output unit configured by a vibrator including a diaphragm and a piezoelectric element disposed on one surface of the diaphragm, wherein in the outputting, in the drive signal, a signal component having a frequency higher than a predetermined frequency is output as audio, and a signal component having a frequency equal to or lower than the predetermined frequency is output as vibration, and the drive signal is a signal obtained by superimposing an audio signal and a vibration signal set for a period during which an amplitude of the audio signal exceeds a predetermined threshold, and the vibration signal is generated based on the threshold of the amplitude of the audio signal that has been input.

10. An auditory tactile sense presentation device comprising:

a receptor configured to receive an input of a drive signal; and an output unit configured to perform an output based on the drive signal, wherein the output unit is configured by a vibrator including a piezoelectric element, the vibrator outputs, in the drive signal, a signal component having a frequency higher than a predetermined frequency as audio and outputs a signal component having a frequency equal to or lower than the predetermined frequency as vibration, and the drive signal is a signal obtained by superimposing an audio signal and a vibration signal set for a period during which an amplitude of the audio signal exceeds a predetermined threshold, and the vibration signal is generated based on the threshold of the amplitude of the audio signal that has been input.

* * * * *